United States Patent
Lee

(10) Patent No.: US 6,293,186 B1
(45) Date of Patent: Sep. 25, 2001

(54) HEATING POT FOR DECOCTING CHINESE HERBS

(76) Inventor: Sang-jun Lee, 221-38, Suyu 3-dong, Kangbukagu, Seoul (KR)

( * ) Notice: Subject to any disclaimer, the term of this patent is extended or adjusted under 35 U.S.C. 154(b) by 0 days.

(21) Appl. No.: 09/573,094

(22) Filed: May 17, 2000

Related U.S. Application Data

(63) Continuation-in-part of application No. 09/311,989, filed on May 14, 1999, now Pat. No. 6,112,643.

(30) Foreign Application Priority Data

Jun. 8, 1998 (KR) .................................................. 98-21067

(51) Int. Cl.⁷ .............................. A47J 37/04; F27D 11/00
(52) U.S. Cl. .............................. 99/293; 99/323.3; 99/410; 99/413; 219/430; 219/433
(58) Field of Search ..................... 99/275, 323.3, 99/403, 410, 413, 293; 219/430, 432, 433, 436, 438

(56) References Cited

U.S. PATENT DOCUMENTS

| 5,107,096 | * | 4/1992 | Knees | 99/410 X |
| 5,619,905 | * | 4/1997 | Wu | 99/323.3 |
| 5,782,165 | * | 7/1998 | Glenboski et al. | 99/413 X |

* cited by examiner

*Primary Examiner*—Reginald L. Alexander
(74) *Attorney, Agent, or Firm*—Orum & Roth

(57) ABSTRACT

A heating pot for decocting Chinese herbs, including a container on which Chinese herbs are to be contained, a heater received in the container so as not to contact the container, and a condenser installed on the opening of the container, for condensing important medicinal elements contained in vapor. The heater has a ray generation means for generating high temperature infrared rays toward the container, a main reflection means for reflecting the infrared rays to the container, and a follower member which has a lateral follower extending from the side of the heater for shielding the side of the condenser installed in the container, and an upper follower coupled to the top of the lateral follower for shielding the upper portion of the condenser.

10 Claims, 8 Drawing Sheets

HEATING POT FOR DECOCTING CHINESE HERBS

This is a continuation-in-part of application U.S. Ser. No. 09/311,989 filed on May 14, 1999 now U.S. Pat. No. 6,112,643.

BACKGROUND OF THE INVENTION

1. Field of the Invention

The present invention relates to a Chinese herb decoction heating pot for decocting Chinese herbs with light rays, preferably, with infrared rays.

2. Description of the Related Art

When Chinese herbs are decocted, some Chinese herbs and water of about 7 hobs (1 hob=0.381 U.S. pint) are placed in a pot, and then must be decocted for a long time until the amount of the Chinese herb fluid is reduced to about 1 hob. In order to make red ginseng, ginseng and water are placed together in a container and then must be boiled for 48 hours or longer.

As described above, apparatuses for decocting Chinese herbs or those for boiling ginseng to make red ginseng have been disclosed in Korean Patent Application No. 87-4352, Korean Utility Model Registration Nos. 14210, 47911, and 059092, Japanese Utility Model Registration Nos. 1775361 and 1954554, and U.S. Pat. No. 4,759,275.

For example, "Chinese herb decocting pot using far infrared rays" has been disclosed in Korean Patent Application No. 87-4352. The invention"Chinese herb decocting pot using far infrared rays" comprises a far infrared ceramic heater, an exterior pot made of thermotempered glass and installed in contact with the ceramic heater, an interior pot installed inside the exterior pot, and a ceramic filtering plate attached on the bottom of the interior pot. Infrared rays generated from the ceramic heater heats a medicinal fluid and Chinese herbs by concentratedly heating the bottom of the pot.

However, these apparatuses have the following problems.

First, since Chinese herbs are decocted by the ceramic heater concentratedly heating the bottom of the internal pot, the medicinal fluid or the Chinese herbs are scorched or burnt. That is, the Chinese herbs typically contain many herbal medicines and mineral matters, and the mineral matters, horns, bones, clams, etc. are settled without floating on the water. Thus, in the course of decocting these Chinese herbs, the horns, bones, clams, etc., are piled up thickly on or scorched and stick to the bottom of the pot, and they are burnt in the worse case. Also, in order to make red ginseng, ginseng and water are placed together in a pot and then must be boiled for 48 hours or longer. Here, as the water evaporates, the ginseng is scorched or burnt on the bottom of the pot. Hence, much care is required to decoct Chinese herbs or ginseng for a long period of time.

Second, infrared rays generated from the ceramic heater are not entirely absorbed to the interior pot and the filtering plate but partially reflected by them to be discharged to the outside of the exterior pot. Thus, thermal efficiency is not good.

Third, the interior pot and the filtering plate are installed inside the exterior pot, so that it is inconvenient to use them. Also, the manufacturing costs are increased.

SUMMARY OF THE INVENTION

To solve the above problems, it is an objective of the present invention to provide a heating pot which prevents Chinese herbs from being scorched or burnt, and can maximize thermal efficiency and can be easily used.

To achieve the above objective, there is provided a heating pot for decocting Chinese herbs, comprising: a container on which Chinese herbs are to be contained; a heater received in the container so as not to contact the container, the heater having a ray generation means for generating high temperature infrared rays toward the container, a main reflection means for reflecting the infrared rays to the container, and a follower member which has a lateral follower extending from the side of the heater for shielding the side of the condenser installed in the container, and an upper follower coupled to the top of the lateral follower for shielding the upper portion of the condenser; and a condenser installed on the opening of the container, for condensing important medicinal elements contained in vapor.

BRIEF DESCRIPTION OF THE DRAWINGS

The above objective and advantages of the present invention will become more apparent by describing in detail preferred embodiments thereof with reference to the attached drawings in which.

DESCRIPTION OF THE PREFERRED EMBODIMENTS

Referring to FIGS. 1 through 5, a heating pot for decocting Chinese herbs or making ginseng into red ginseng, according to a first embodiment of the present invention, includes a container 10 for containing Chinese herbs, and a heater 20 for receiving the container 10 and heating the received container 10 with light rays, preferably, with infrared rays.

The container 10 is made of thermotempered glass to transmit infrared rays well. A knob and protrusion 11 is installed on the upper portion of the container 10 to be hung on the opening of the heater 20 so that the bottom surface of the container 10 does not touch the bottom of the heater 20. Preferably, a reflection layer for reflecting infrared rays toward the inside of the container, or an absorption layer for absorbing the infrared rays, is installed on the exterior of a portion of the container 10 not inserted into the heater 20. For example, it is preferable that the reflection layer is made of a metallic material such as aluminum, stainless steel, gold, etc., and that the absorption layer is made of a material such as cloth or leather. The reflection layer reflects the infrared rays toward the interior of the container to prevent heat from being discharged to the outside, and the absorption layer keeps the interior of the container warm while absorbing heat. However, if the reflection layer can reflect infrared rays toward the interior of the container, even though it is made of a nonmetallic material, the non-metallic reflection layer can provide the effects of the present invention.

Figure 1:
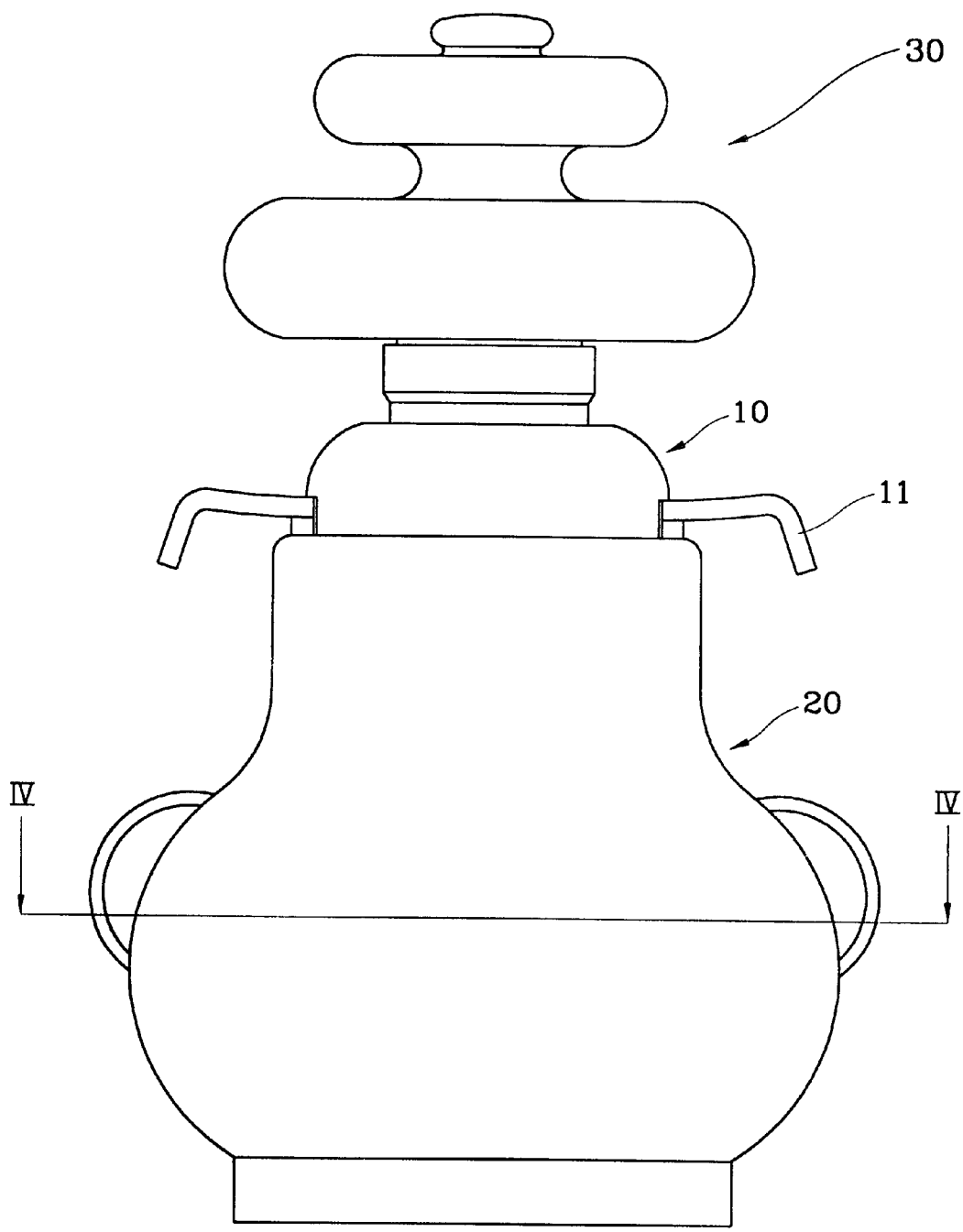
FIG. 1 is a side view of a heating pot according to a first embodiment of the present invention.
Figure 2:
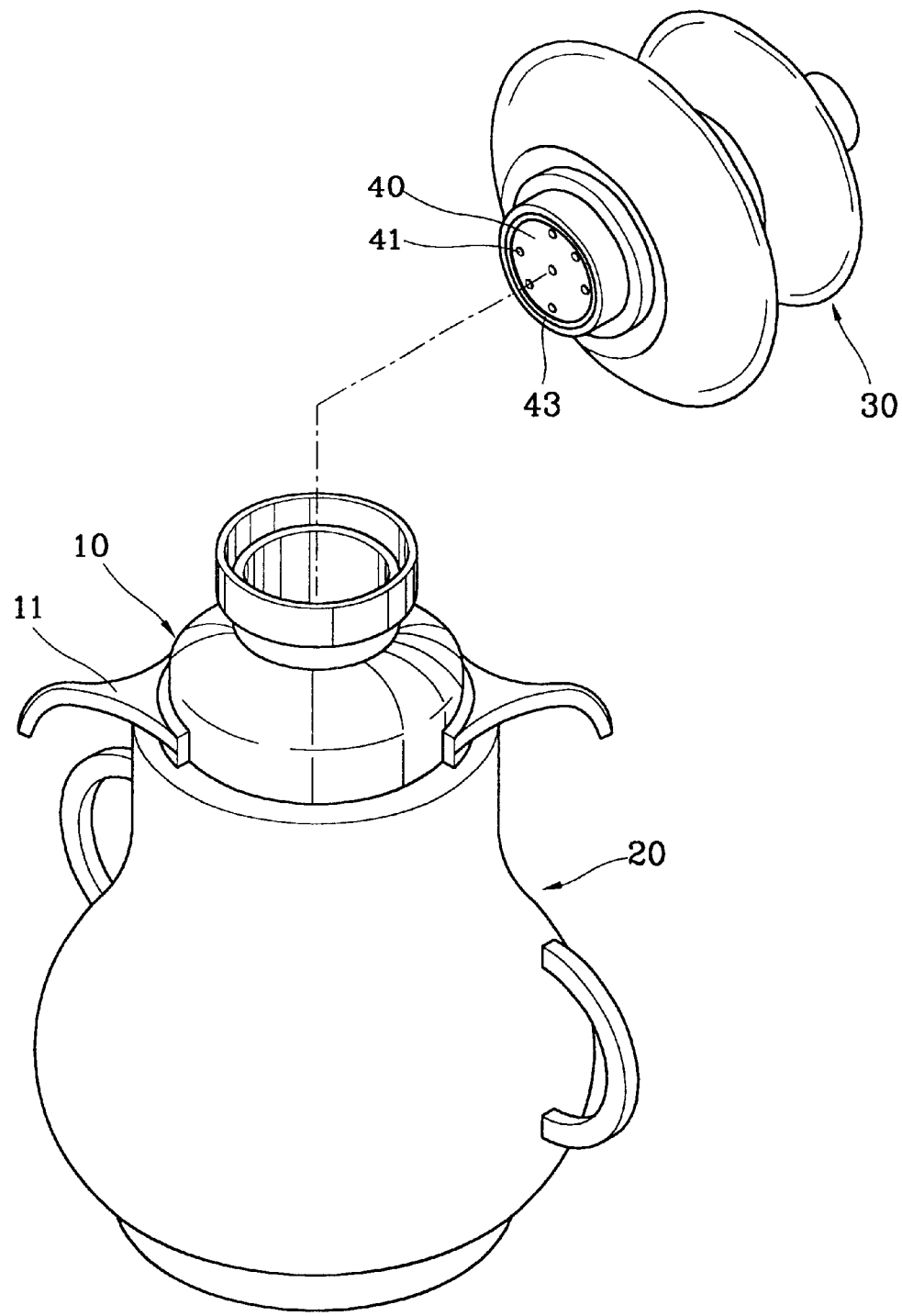
FIG. 2 is an exploded perspective view of the heating pot of FIG. 1

Referring to FIG. 2, a condenser 30 for condensing essential medicinal elements in vapor is installed on the opening of the container 10. The condenser 30 is made of glass. A reflection lid 40 made of a stainless plate or an aluminum plate surrounded by a silicon 43 is installed on the opening of the condenser 30. The reflection lid 40 has holes 41 leading to the interior of the condenser 30.

When the condenser 30 is installed on the container 10, the reflection lid 40 reflects infrared rays within the container 10 toward the inside of the container 10 without the infrared rays escaping to the outside, and the holes 41 formed in the reflection cover 40 delays the inflow of heated vapor from the container to the condenser 30 to induce the vapor to be condensed within the container 10.

Figure 3:
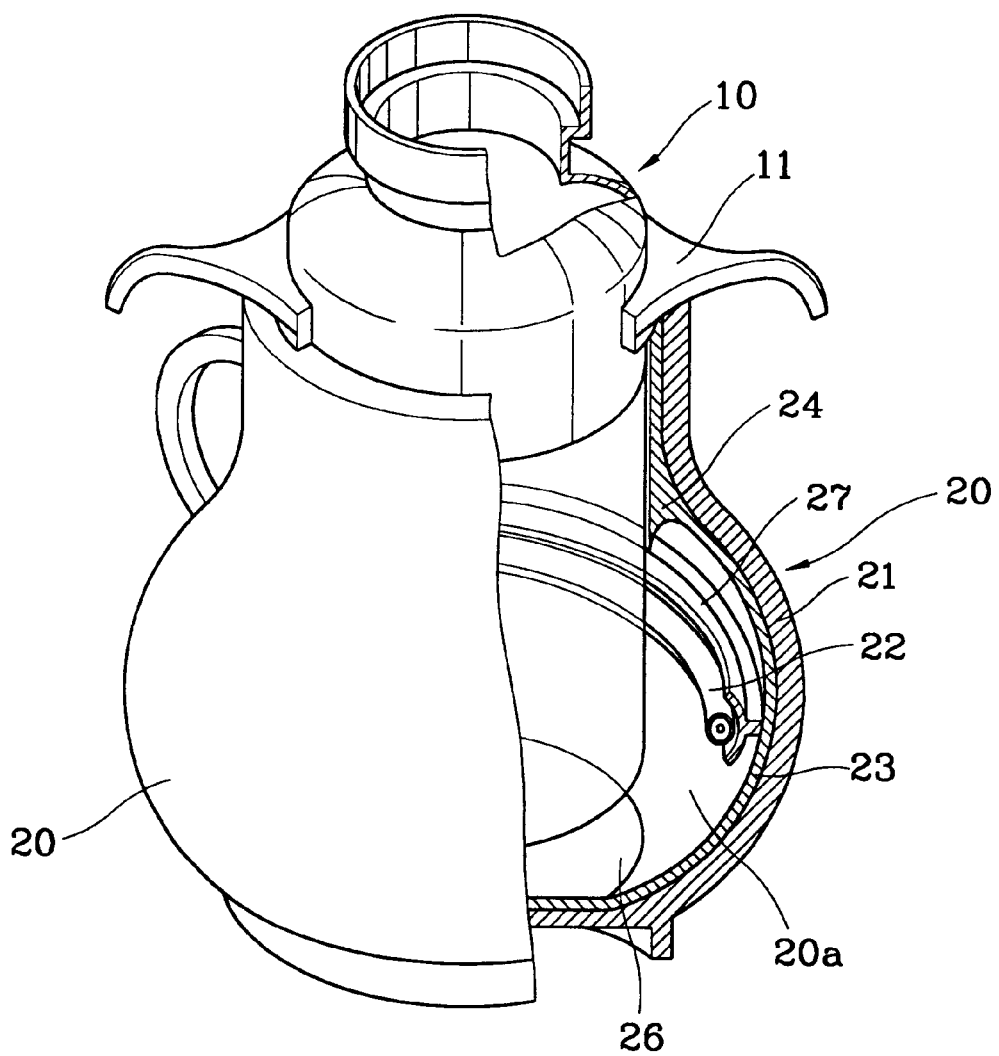
FIG. 3 is a partially-opened perspective view of the heating pot of FIG. 1.

Referring to FIG. 3, the heater 20 is comprised of a body 21 protecting the container 10, a ray generation means 22 installed between the body 21 and the container 10 for generating rays, preferably, infrared rays, and a main reflection means 23 installed on the inner surface of the body 21 for reflecting the rays, preferably, the infrared rays. An insertion space 20a is provided inside the body 21 such that the container 10 can be inserted into the body 21. This body is made of a heat shield material, preferably, a phenol resin. Here, if the main reflection means can reflect infrared rays, even though it is made of a non-metallic material, the non-metallic main reflection means can provide the same effects as the present invention.

The inner surface of the body 21 is concave to prevent infrared rays generated by the ray generation means 22 from being reflected toward the opening of the container 10. Here, a downward protrusion 24 is formed from the opening of the body 21 to the starting portion of the concave portion. The protrusion 24 allows water poured into the opening of the body 21 to drop down to the bottom 26 without flowing into the ray generation means 22.

The main reflection means 23 is preferably made of a material capable of reflecting infrared rays without absorbing them, e.g., a metal material such as stainless steel or a gold-plated material.

Figure 4:
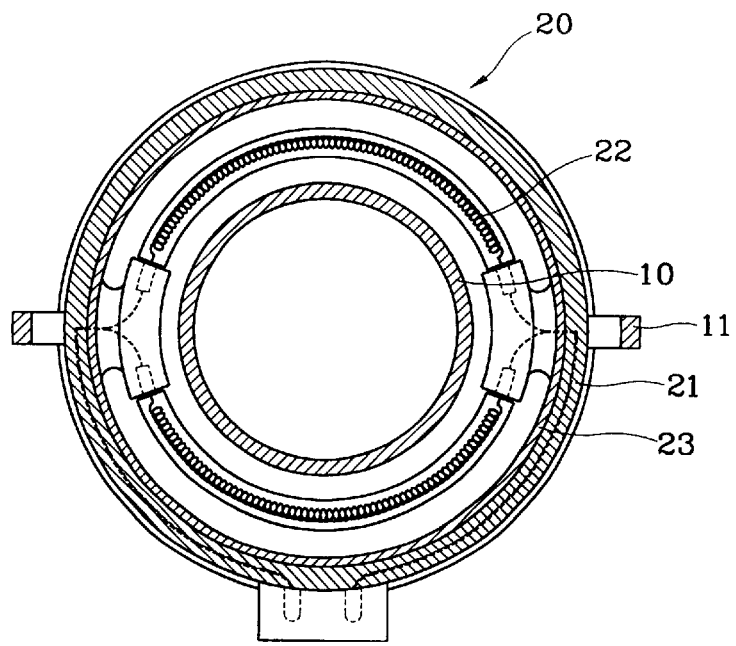
FIG. 4 is a cross-sectional view of an embodiment of the header of FIG. 1 taken along line IV—IV of FIG. 1.
Figure 5:
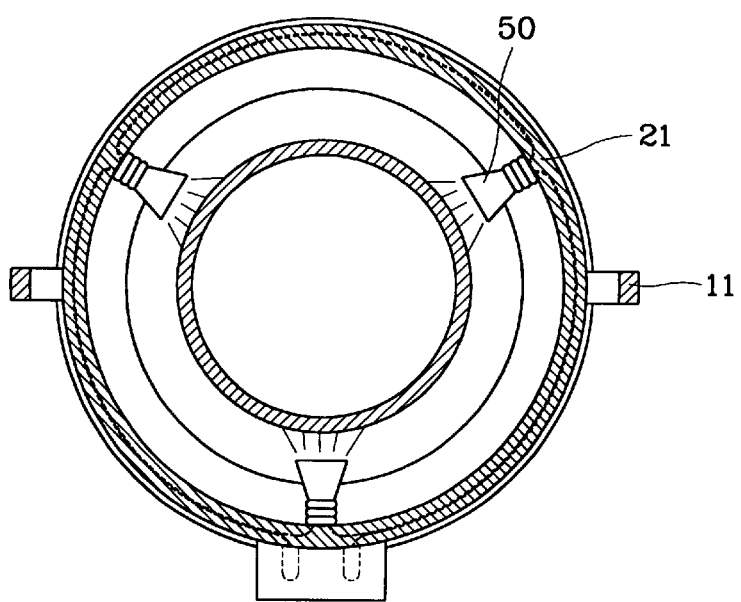
FIG. 5 is a cross-sectional view of another embodiment of the header of FIG. 1 taken along line IV—IV of FIG. 1.
Figure 6:
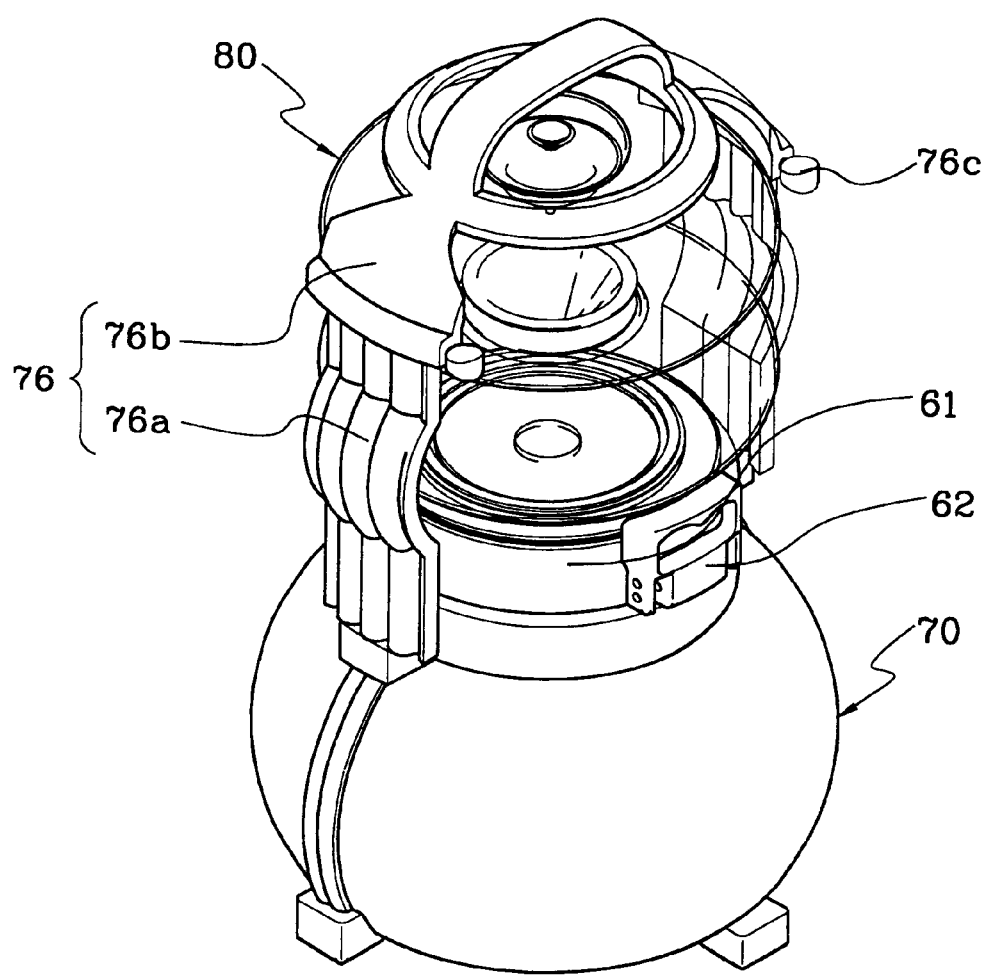
FIG. 6 is a perspective view of a heating pot according to a second embodiment of the present invention.

Preferably, an auxiliary reflection means 27 for reflecting rays to the container 10 is installed between the ray generation means 22 and the main reflection means 23. The auxiliary reflection means 27 is adjacent to the ray generation means 22, so that it can effectively reflect infrared rays toward the container 10. The ray generation means 22 can be realized in several forms such as an arched halogen lamp, an argon lamp, an infrared lamp, and a ceramic heater as shown in FIG. 4, or can be realized as a plurality of independent lamps 50 as shown in FIG. 5. The use of the halogen lamp among the above-mentioned lamps is preferred considering the price and the durability.

The heating pot according to the present invention including the above-described components decocts Chinese herbs as follows.

Referring to FIGS. 3 and 4, some of the infrared rays generated by the ray generation means 22 pass through the container 10, and the rest is reflected by the main reflection means and the auxiliary reflection means. Some of the infrared rays passed through the container 10 are applied to Chinese herbs and a medicinal fluid. The infrared rays passed through or reflected by the container 10 are reflected by the main reflection means 23 and the auxiliary reflection means 27 and finally applied to the Chinese herbs and the medicinal fluid. As described above, the infrared rays three-dimensionally heat the Chinese herbs and the medicinal fluid from all directions to prevent them from being scorched or burnt, thus increasing thermal efficiency.

The reflection lid 40 of the condenser 30 reflects infrared rays generated by the ray generation means 22 back into the container 10, and the holes 41 of the reflection lid 40 delay the inflow of heated steam into the condenser 30 to prevent transmission of heat to the condenser. Thus, the energy used to decoct Chinese herbs and medicinal fluid can be minimized, so that the thermal efficiency can be increased to a higher level.

According to experiments conducted by the present inventor in which 1000 g of ginseng and 100 g of water are placed together in a container and boiled for 48 hours, the ginseng was neither scorched nor burnt while turning reddish-brown. Thus, the boiled ginseng did not provide a burnt taste or smell, and tasted very good. Infrared rays or visible rays might produce new medicinal elements, or accelerate the generation of the new medicinal elements. Also, new medicinal elements are produced while the ginseng is changed into reddish-brown ginseng, so that the reddish-brown ginseng has an excellent medicinal value.

The technical spirit of the present invention exists not in decoction made by concentratedly heating the bottom of a container with infrared rays or far infrared rays but in decoction made by three-dimensionally heating Chinese herbs and medicinal fluid within the container from all directions, and also in acceleration of the generation of efficacious medicinal elements caused by applying visible rays and ultraviolet rays.

In the heating pot according to the present invention, rays three-dimensionally heat Chinese herbs or medicinal fluid in an area that is five or more times larger than a conventional heating pot, thereby preventing scorching or burning. Therefore, the medicinal value of the decocted Chinese herb fluid is not reduced, and the decocted Chinese herb fluid tastes good. Also, since the rays are not discharged to the outside, the thermal efficiency is excellent. Furthermore, since an interior pot is not installed, the heating pot according to the present invention can be easily used, while the manufacturing costs can be reduced.

Referring to FIGS. 6 through 11, a heating pot for decocting Chinese herbs or making ginseng into red ginseng, according to the second embodiment of the present invention, includes a container 60 for containing Chinese herbs, a heater 70 for receiving the container 60 and heating the received container 60 with light rays, preferably, with infrared rays, and a condenser 80 installed on the container 60 for condensing vapor generated within the container 60.

The container 60 is made of thermotempered glass to transmit infrared rays well. A ring-shaped protrusion 60a protruding in a radial direction is formed on the outer circumferential surface of the upper portion of the container 60. A rim 61 consisting of first and second semi-rims 61a and 61b having a semicircular shape is coupled to the protrusion 60a. Wings are bent at the ends of the first and second semi-rims 61a and 61b, and two holes 61c are formed on each of the wings. The first and second semi-rims 61a and 61b are put on the protrusion 60a so as to surround it, with wings facing each other. In this state, the wings are positioned at both ends of a knob 62, and bolts 62a pass through the knob 62 and the holes 61c of the wings, and are fixed by bolts 62b. In this way, the rim 61 is securely fixed to the protrusion 60a. The rim 61 is put on the opening of an annular rim 74 to be described later to prevent the bottom surface of the container 60 from contacting the bottom of the heater 70 when the container 60 is inserted into the heater 70. Here, the rim 61 has a highly reflective inner surface so as to reflect infrared rays generated within the heater back to the inside of the container. Preferably, the rim 61 is made of a material having a high reflectivity, such as aluminum or stainless steel. If the rim 61 can reflect infrared rays into the container 60, it can provide the effects of the present invention even if it is made of a nonmetallic material.

Figure 9:
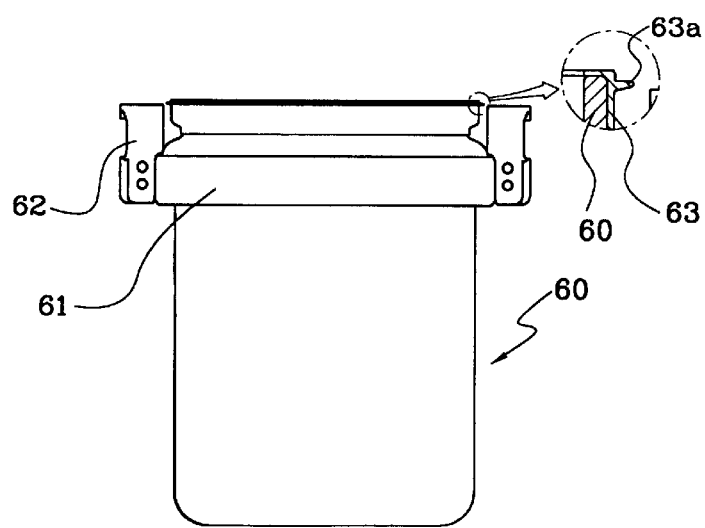
FIG. 9 is a side elevation view of the container of FIG. 7.

A flexible rim 63 is installed around the outer circumference of the opening of the container 60. As shown in FIG. 9, installed on the flexible rim 63 is a water flow preventing protrusion 63a protruding in a radial direction. The water flow preventing protrusion 63a prevents medical fluid contained in the container from flowing out along the wall of the container 60 due to the surface tension of the medical fluid when being poured into the container.

The heater 70 is comprised of a body 71 for protecting the container 60, a ray generation means 72 installed between the body 71 and the container 60 for generating rays, preferably, infrared rays, a main reflection means 73 installed on the inner surface of the body 71 for reflecting infrared rays, and an annular rim 74 installed at the opening of the body 71 to put the rim 61 of the container 60 thereon.

A follower member 76 for shielding the condenser 80 installed on the container 60 is installed on the body 71. The follower member 76 consists of a lateral follower 76a extending upward from the body 71 for shielding the lateral face of the condenser 80, and an upper follower 76b coupled to the top of the lateral follower 76a for shielding the top of the condenser 80. The upper portion of the lateral follower 76a and the upper follower 76b have locking holes, and the lateral follower 76a and the upper follower 76b can be locked to each other using a locking member 76c. Here, a knob for facilitating movement is formed on the upper portion of the upper follower 76b.

The inside of the body 71 is provided with an insertion space 70a into which the container 60 is to be inserted. Preferably, the body 71 is made of an insulating material, but can be formed of various materials such as phenol resin, polycarbonate, PVC, metal, non-metal, or ceramic.

The main reflection means 73 on the inner surface of the body 71 is designed so as to completely shield the container 60, and made of a material which can reflect infrared rays without being absorbed, for example, a metal such as stainless steel or a metal-coated material. However, the main reflection means can be formed of a non-metallic material only if it can reflect infrared rays.

Preferably, an auxiliary reflection means 75 for reflecting infrared rays to the container is installed between the ray generation means 72 and the main reflection means 73. The auxiliary reflection means 75 is installed adjacent to the ray generation means 72, so that it can effectively reflect infrared rays which are not heading for the container 60. The auxiliary reflection means is also made of a metal such as stainless steel, or a metal-coated material, and can be made of a nonmetallic material only if it can reflect infrared rays.

Figure 11:
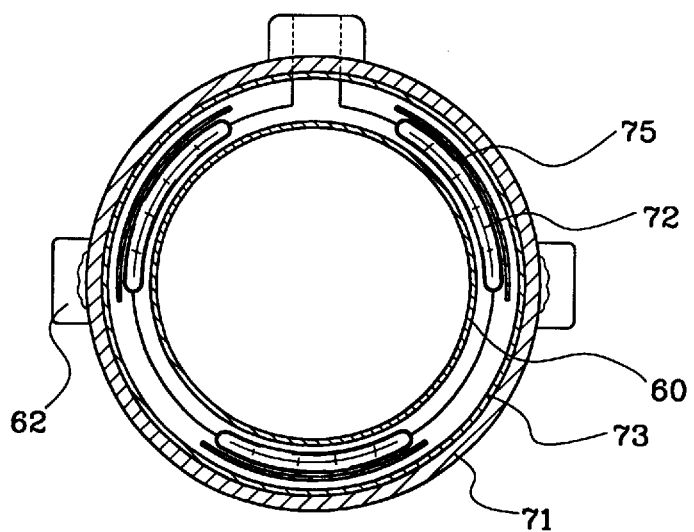
FIG. 11 is a cross-sectional view taken along line XI—XI of FIG. 8.

The ray generation means 72 can be realized in several ways. In the present embodiment, three 300 W halogen lamps are adopted as the ray generation means 72. As shown in FIG. 11, the halogen lamps are bended like a bow so as to keep a constant distance from the circumference of the container 60, and connected to each other in series. The constant interval between the halogen lamp and the container allows infrared rays to be transmitted to the container 60 at a constant intensity, so that uniform heating is possible and thermal efficiency is increased. Also, the serial connection between halogen lamps can reduce applied loads, whereby the durability of the halogen lamps can be increased. However, the ray generation means 72 can be realized with an argon lamp, an infrared lamp, a ceramic heater, a seize heater or the like.

Figure 8:
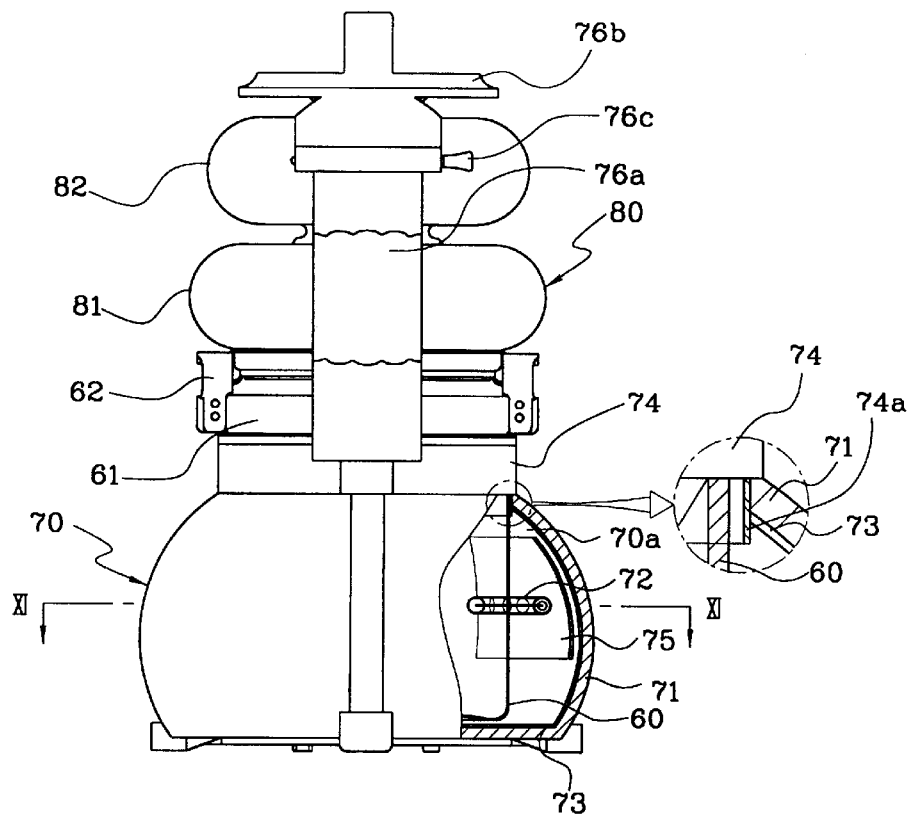
FIG. 8 is a partly cut away side elevation view of the heating pot of FIG. 6.

The annular rim 74, on which the rim 61 of the container 60 is put, has an extending portion 74a which protrudes downward from the opening of the main reflection means 73, as shown in FIG. 8. The extending portion 74a is used to drop water down the bottom of the heater 20 when water produced by an external factor or during decocting Chinese herbs flows toward the heater 70. Hence, water is prevented from flowing directly into the ray generation means 72, thus preventing electrical shorts.

Figure 10:
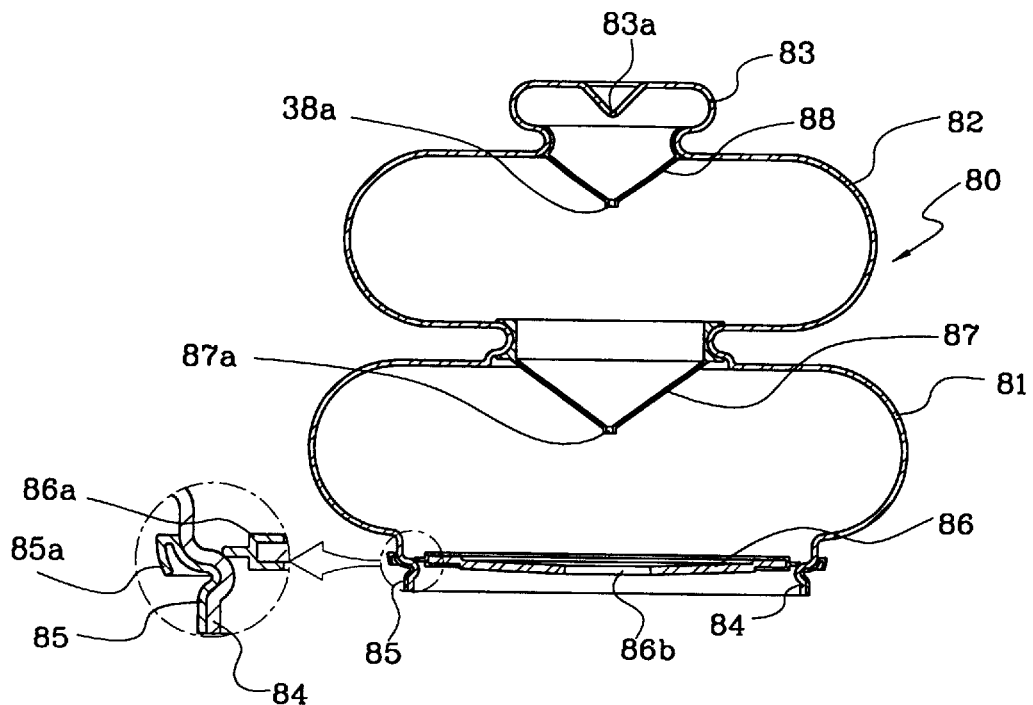
FIG. 10 is a side cross-sectional view of the condenser of FIG. 7.

The condenser 80, as shown in FIG. 10, is made of glass and installed on the opening of the container 60. The condenser 80 includes first and second condensing rooms 81 and 82 for condensing vapor produced in the container 60, a third condensing room 83 which is formed on the top of the second condensing room 82, acts as a knob, and has a small air hole 83a formed therethrough, and a connection portion 84 which is formed on the bottom of the first condensing room 81 and inserted into the opening of the container 60.

Figure 7:
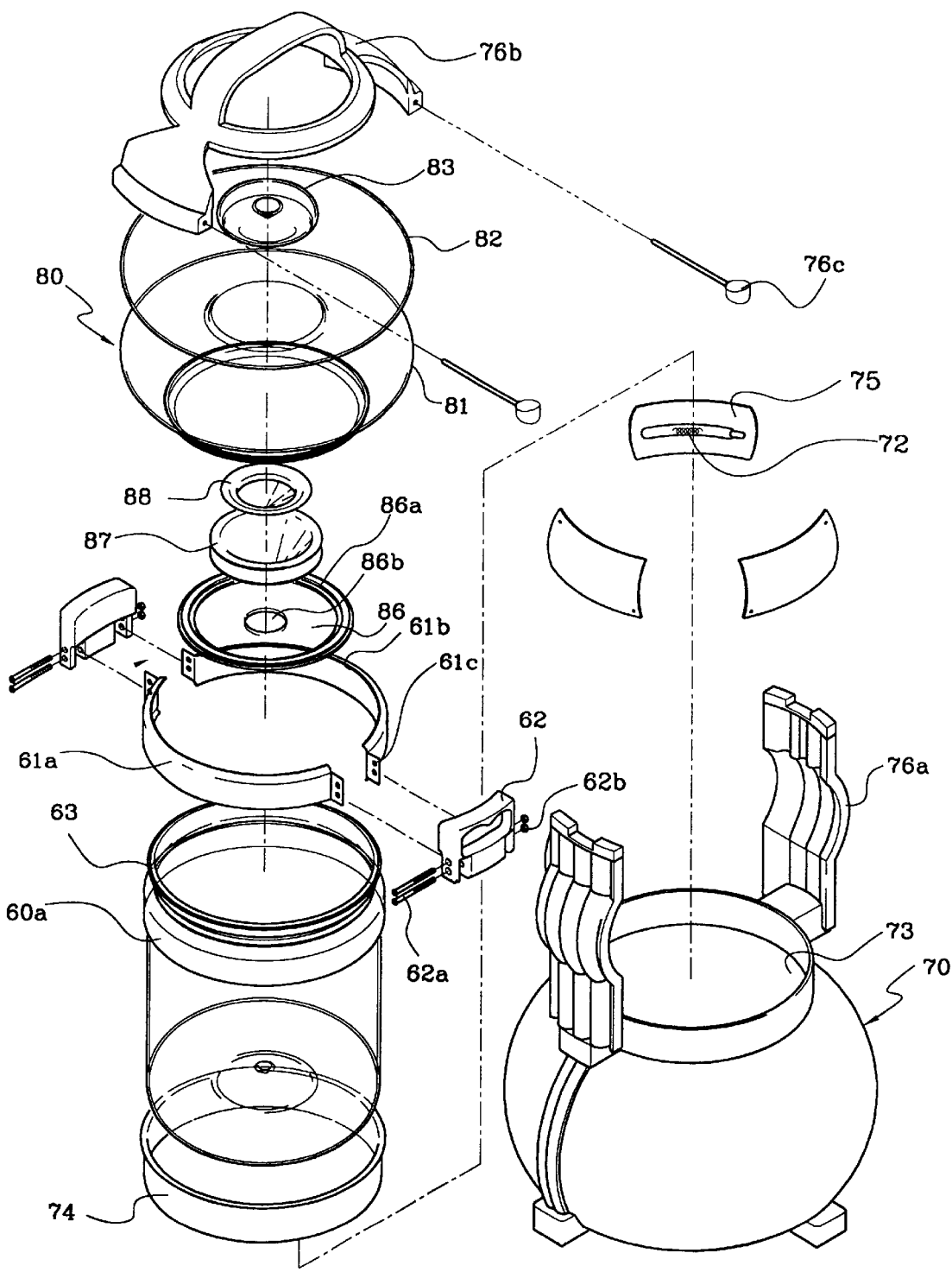
FIG. 7 is an exploded perspective view of the heating pot of FIG. 6.

As shown in FIGS. 7 and 10, installed within the connection portion 84 is a turn-around member 86 which has a hole 86b formed on its center and a sealing member 86a made of a flexible material such as silicon installed around its periphery. Since the position of the hole 86b is lower than the periphery of the turn-around member 86, the turn-around member 86 has a roughly plate shape. The turn-around member 86 delays the movement of vapor from the container 60 to the first condensing room 81, and turns medical fluid, which has been condensed and fluidized in the first condensing room 81, around into the container 60. Here, since the position of the hole 86b is lower than the periphery, the condensed medical fluid easily flows into the container 60. Also, the turn-around member 86 reflects infrared rays generated from the heater 70 back into the container 60, thus preventing emission of thermal energies to outside.

Also, as shown in FIG. 10, installed within the connection portion 84 is a sealing member 85 which prevents overflow of medical fluid and escape of vapor while the medical fluid is being decocted. An annular flap 85a is formed on the periphery of the sealing member 85 to more securely seal the sealing member to the opening of the container. The sealing member 85 is made of a flexible material.

A main vapor efflux delay member 87 having a funnel shape is installed between the first and second condensing rooms 81 and 82 to delay the flow of vapor, which has passed through the turn-around member 86, into the second condensing room 82. A small hole 87a is formed at the center of the main vapor efflux delay member 87. The main vapor efflux delay member 87 delays evaporation of vapor into the second condensing room 82 and allows the vapor to be condensed in the first condensing room 81, thereby delaying evaporation of efficacious medicinal elements contained in vapor. The main vapor efflux delay member 87 is made of a flexible material.

An auxiliary vapor efflux delay member 88 having a funnel shape is installed between the second and third condensing rooms 82 and 83 to delay the flow of vapor, which has passed through the first condensing room 81, into the third condensing room 83. A small hole 88a is formed at the center of the auxiliary vapor efflux delay member 88. The auxiliary vapor efflux delay member 88 delays evaporation of vapor into the third condensing room 83 and allows the vapor to be condensed in the second condensing room 82, thereby delaying evaporation of efficacious medicinal elements contained in vapor. The auxiliary vapor efflux delay member 88 is made of a flexible material.

An important role of the condenser 80 is to collect efficacious medicinal elements escaping being contained in vapor and put the efficacious medicinal elements back into the container 60. For example, when ginseng (e.g., fresh ginseng, white ginseng, or dried ginseng) is decocted, phytoncide, which is the most important efficacious element, is evaporated together with vapor, the condenser 80 condenses vapor and puts it into the container 60. Also, the condenser 80 prevents the outflow of thermal energies contained in vapor by preventing as much as possible discharge of vapor to outside, thus increasing the efficiency of energies.

The heating pot according to the second embodiment of the present invention including the above-described components decoct Chinese herbs as follows.

Some of the infrared rays generated by the ray generation means proceed directly to the container, while the rest is reflected by the main reflection means and the auxiliary reflection means and then proceed to the container. The infrared rays proceeds directly and indirectly to the container, thereby three-dimensionally heating the Chinese herbs and the medicinal fluid. Thus, the Chinese herbs and the medicinal fluid can be decocted without being scorched or burnt. At this time, some of the infrared rays are reflected back into the container 60 by the turn-around member 36 (or the reflection lid) to prevent discharge of heat to the outside.

Heated vapor produced during decoction is condensed by the turn-around member 36, the main vapor efflux delay member 87 and the auxiliary vapor efflux delay member 88 of the condenser 80, and collected back into the container 80 via the hole 86b of the turnround member 86. In this way, discharge of heat to the outside is prevented simultaneously with collection of efficacious medicinal elements, thus increasing energy efficiency.

When the medicinal fluid is completely decocted, the upper follower 76b is separated from the lateral follower 76a, and the condenser 80 is separated from the container 60, and then the container 60 is separated from the heater 70 using the knob 62.

Thereafter, when the medicinal fluid is poured into another vessel, it flows directly into the vessel without flowing along the sidewall of the container 60, by virtue of the water flow prevention protrusion 63a on the flexible rim 63.

The heating pot according to the present invention adopts a condenser having a turn-around member, a main vapor efflux delay member, and an auxiliary vapor efflux delay member, such that efficacious medicinal elements contained in vapor can be securely collected, and discharge of thermal energies to the outside is prevented. Therefore, energy efficiency can be increased.

Also, the heating pot according to the present invention can be easily transferred even while medicinal fluid is being decocted, by adopting a follower member.

A protrusion is formed at the top of a container and surrounded by a semi rim, and then a knob can be fixed to the container by nuts and bolts. As a result, the knob can be easily coupled to a glass container.

Even after a medicinal fluid is completely decocted, the container can be easily transported, and the medicinal fluid can be prevented from flowing along the sidewall of the container. Thus, an accurate amount of medicinal fluid can be poured.

A hot medicinal fluid is prevented from flowing along the sidewall of the container, so that a user is protected from being burnt.

What is claimed is:

1. A heating pot for decocting Chinese herbs, comprising:
   a heater;
   a container received in the heater so as not to contact the heater, the heater having a ray generation means for generating high temperature infrared rays toward the container, a main reflection means for reflecting the infrared rays to the container, and a follower member which has a lateral follower extending from the side of the heater for shielding the side of a condenser installed in the container, and an upper follower coupled to the top of the lateral follower for shielding the upper portion of the condenser; and
   the condenser installed on an opening of the container, for condensing important medicinal elements contained in vapor.

2. The heating pot for decocting Chinese herbs of claim 1, wherein the condenser comprises:
   first and second condensing rooms installed in the container;
   a third condensing room which is formed on top of the second condensing room, acts as a knob, and has an air hole formed therein; and
   a main vapor efflux delay member installed between the first and second condensing rooms for delaying the flow of vapor from the first condensing room into the second condensing room.

3. The heating pot for decocting Chinese herbs of claim 2, wherein the condenser further comprises an auxiliary vapor efflux delay member installed between the second and third condensing rooms for delaying the flow of vapor from the second condensing room into the third condensing room.

4. The heating pot for decocting Chinese herbs of claim 3, wherein the auxiliary vapor efflux delay member has a funnel shape, and has a hole formed on its edge.

5. The heating pot for decocting Chinese herbs of claim 2, wherein the condenser further comprises a turn-around member which is installed within the first condensing room, has a hole formed on the center, and a flexible sealing member which is installed around its periphery and entirely shaped of a plate, wherein the position of the hole is lower than the periphery.

6. The heating pot for decocting Chinese herbs of claim 1, further comprising:
   a rim for shielding a protrusion protruding in a radial direction on the upper portion of the container; and
   a knob installed on the rim.

7. The heating pot for decocting Chinese herbs of claim 6, wherein the rim has first and second semi rims and, each having wings which are bent at both ends, placed at both sides of the knob, and have through holes formed therethrough, the first and second semi rims for shielding the protrusion.

8. The heating pot for decocting Chinese herbs of claim 6, further comprising a flexible rim which is installed around the outer circumference of the opening of the container, and provided with a water flow prevention protrusion for preventing a medicinal fluid from flowing along the sidewall of the container when being poured out of the container.

9. The heating pot for decocting Chinese herbs of claim 1, further comprising an annular rim which is installed at the opening of the heater, and has an extending portion protruding downward from the opening of the main reflection means.

10. The heating pot for decocting Chinese herbs of claim 1, wherein the ray generation means is at least two halogen lamps which are rounded to maintain a regular distance from the container and connected to each other in series.

* * * * *